UNITED STATES PATENT OFFICE 1,984,935

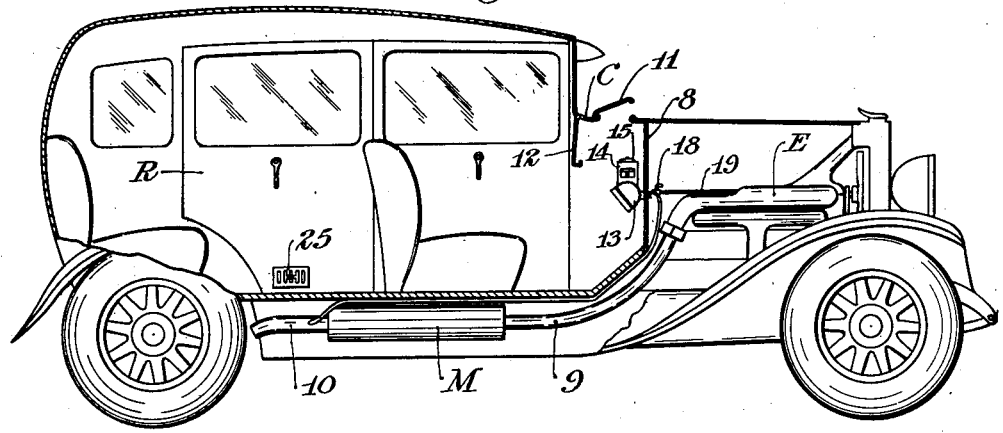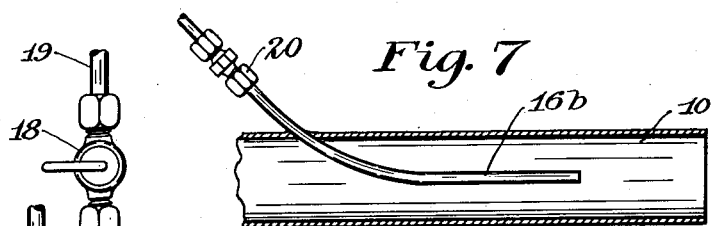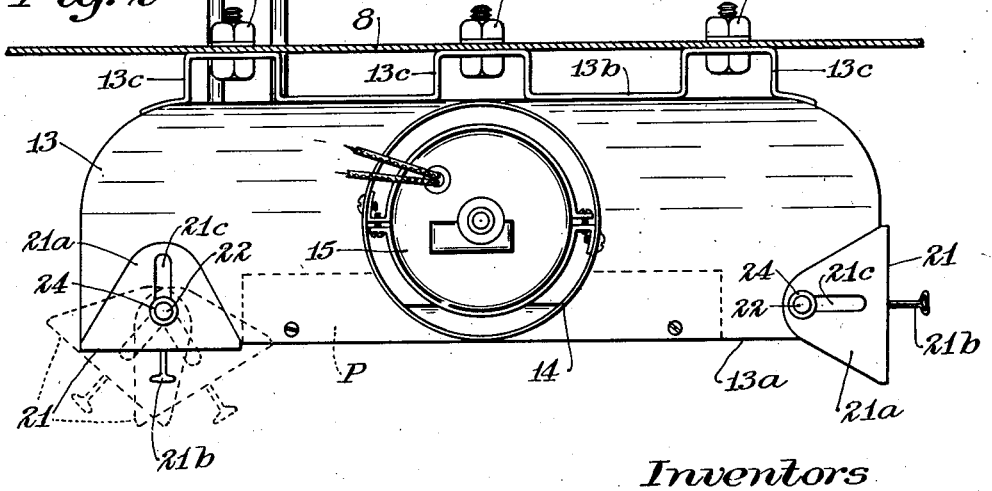

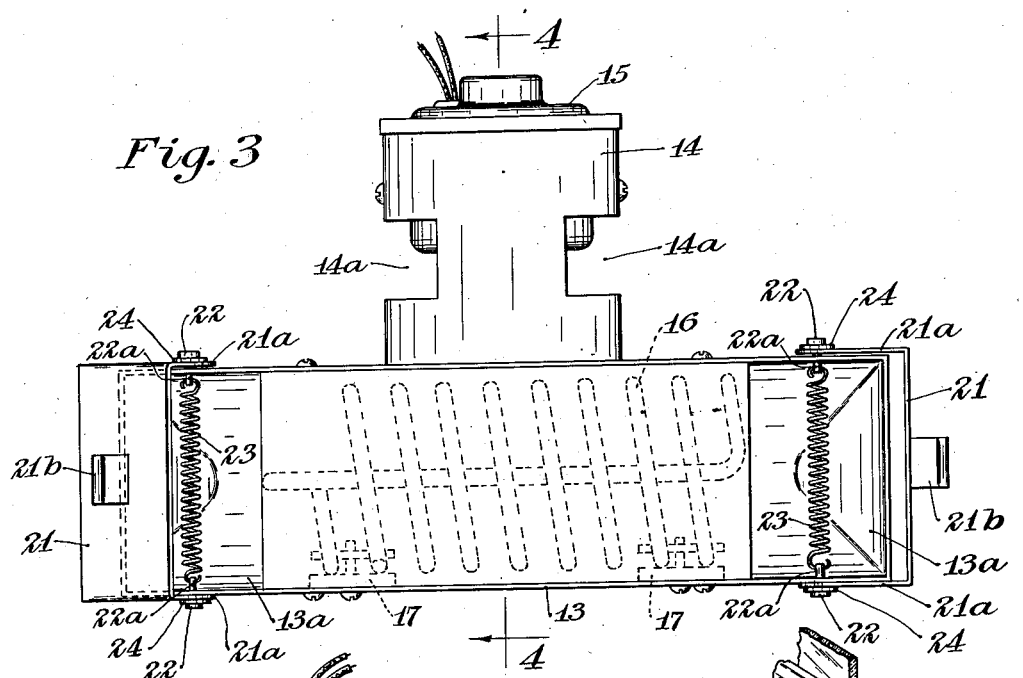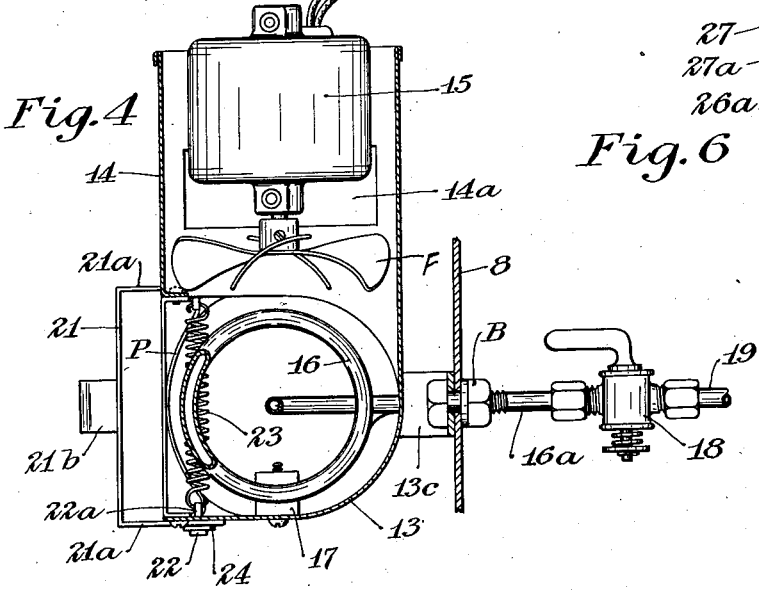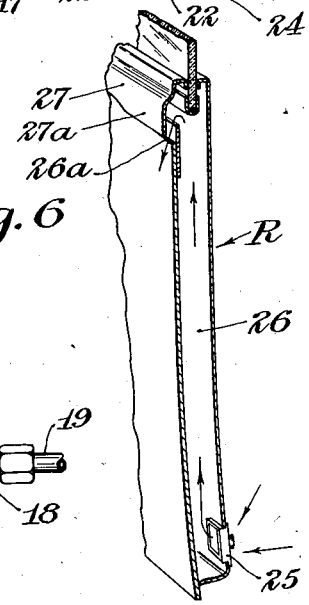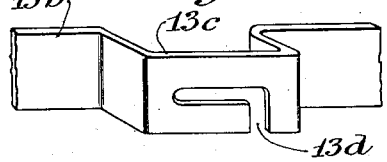

AUTOMOBILE HEATING SYSTEM AND HEATER

William F. La Mayeau, John W. Farmer, and Harlan M. Smith, Minneapolis, Minn., assignors to Standard Ventilator and Heater Co. Inc., Minneapolis, Minn., a corporation of Minnesota Application June 3, 1931, Serial No. 541,850

5 Claims. (Cl. 98—2)

This invention relates to the heating of the interior of motor vehicles and the like and has special reference to an improved heater structure and circulating heating system associated with the engine and body of a motor vehicle.

It is an object of our invention to provide a simple, inexpensive and highly efficient heating system for automobiles and the like which will produce a substantially uniform distribution of hot air throughout both the front and rear portions of the interior of the automobile body and which may be regulated to concentrate more or less heating effect and circulation of warm air to desired locations within most portions of the interior of the automobile body.

A further object is to provide an improved and simplified automobile heater having a high efficiency and adapted to produce a forced circulation of air through a heating chamber, said air entering said chamber laterally thereof and being impinged against efficient heating elements and being divided and passed through said chamber in two opposite directions and discharged and distributed at spaced points adjacent the opposite ends of said chamber.

More specifically it is an object to provide a heating and ventilating system for an automobile wherein circulation of hot air throughout substantially the entire interior of the automobile body is effected by the cooperation of a fan-equipped heater with flues or air escape passages disposed in the walls of the car body adjacent the rear thereof and constructed in such manner as to produce an induced discharge of air during the travel of the vehicle.

A further object is to provide in a system of the class described a highly efficient heater deriving its source of heat from the exhaust line of the engine and utilizing a tubular element or coil, connected with said exhaust line, the circulation of exhaust gas through said coil being facilitated by an induction or venturi action produced by introduction of the discharge from said coil into the discharge end of the exhaust pipe.

These and other objects and advantages of the invention will be more fully set forth in the following description made in connection with the accompanying drawings, in which like reference characters refer to similar parts throughout the several views, and in which:—

Fig. 1 is a vertical section taken longitudinally of an automobile having an embodiment of our invention applied thereto;

Fig. 2 is a horizontal section taken through the dash board of the automobile and showing an embodiment of our improved heater in top plan view;

Fig. 3 is a front elevation of the heater detached;

Fig. 4 is a vertical section taken on the line 4—4 of Fig. 3;

Fig. 5 is a detail fragmentary perspective view showing a suitable form of adjustable attachment bracket for securing the heater casing to the dashboard of the car;

Fig. 6 is a sectional perspective view showing the structure of one of the rear doors which forms a part of the heating system and which is equipped with a register and air discharge ports for regulating the circulation of warm air within the automobile body, and Fig. 7 is a fragmentary sectional view taken longitudinally of the discharge portion of the exhaust pipe and showing association of the discharge end of the heater coil with the exhaust pipe to produce a venturi action through the discharge of exhaust gases.

In Figs. 1, 2 and 6 an embodiment of the invention is shown as applied to an automobile of conventional closed body type having the usual internal combustion engine provided with an exhaust manifold E. The numeral 8 indicates the dashboard, C the cowl and R the rear doors of the automobile body. The exhaust pipe 9 communicates with the usual muffler M which terminates in an exhaust discharge 10 located below the rear portion of the automobile body.

The cowl C of the body is preferably provided with a ventilator 11 of any suitable type adapted to admit and effect a circulation of fresh air into the body adjacent and just rearwardly of dashboard 8.

Our improved heater is mounted at the forward portion of the automobile body preferably secured to the dash 8 at a point just below the edge of the instrument board which is indicated by the numeral 12. Our heater comprises a rectangular box-like casing 13 forming a heating chamber and is closed with the exception of a pair of rectangular air discharge passages 13a in the front wall and adjacent the respective ends thereof, and a central air intake passage formed in the top wall thereof and communicating laterally with the heating chamber. The ends of casing 13 are curved or rounded adjacent the rear wall of the casing to efficiently deflect the air outwardly and laterally through discharge openings 13a. An open ended cylindrical fan casing 14 is secured to the medial portion of casing 13 communicating with the air intake passage through the top of the casing and as shown extending substantially vertically and having two or more enlarged circumferentially arranged air intake recesses 14a formed in the peripheral wall thereof. Heater casing 13 may be attached to the dashboard 8 or some other support by suitable means such as an elongated attachment bracket 13b rigidly secured to the rear wall of the casing and extending longitudinally thereof, said bracket having off set attachment shoulders 13c which as shown are provided with bayonet joint slots 13d extending from one of the longitudinal edges thereof and constructed to adjustably accommodate nutted clamping bolts B. An electric fan motor 15 is mounted in the upper portion of fan casing 14, the case of said motor as shown being spaced concentrically from the inner periphery of the fan casing. A suitable fan F is affixed to the depending end of the armature shaft of motor 15 and as shown is disposed at the inner end of fan casing 14 just above the top of heater casing 13.

A tubular heating coil 16 which may be arranged spirally is mounted longitudinally within heater casing 13 and as shown is secured therein by means of suitable clamping devices 17 constructed of non-combustible material, such as asbestos. Heating coil 16 is connected with a source of hot fluid under pressure, preferably with the exhaust manifold E of the automobile engine and to this end is provided with an intake extremity 16a which extends through the rear wall of casing 13 and also through the dashboard 8 of the automobile body and is coupled by a suitable valve 18 which in turn is connected by a short conduit 19 with the exhaust manifold. Conduit 19 preferably communicates with the exhaust manifold at an acute angle to insure a supply of hot exhaust gases to the heater coil without obstructing the interior of the manifold. The opposite or discharge end of heating coil 16 as shown is extended longitudinally through the center of the coil and is then extended at substantially right angles passing through the rear wall of casing 13 and through the dashboard 8 and extending downwardly and rearwardly as shown in Fig. 1 beneath the floor of the car over the muffler M and terminating as shown in Fig. 7 in a discharge tube 16b which may be detachably connected by means of a coupling 20 and which is extended into the axial center of the exhaust pipe discharge 10 and directed rearwardly thereof, preferably being rigidly secured to the exhaust discharge at the point where it passes through the peripheral wall thereof.

A plate P of arcuate cross section is fixed to the inner surface of the front wall of the heater casing extending between the air discharge passages 13a for the purpose of effecting a more uniform impingement of air against the coil.

The discharge passages 13a of the heater casing are provided with efficient adjustable deflectors or doors 21 which are, as shown, in the form of rectangular plates having oppositely disposed turned attachment ears 21a which embrace the top and bottom walls of the casing 13 and which are pivotally connected thereto by means of axially aligned swivels 22 extending through the casing 13 and terminating in eyes 22a which are interconnected and urged together by means of a contractile spring 23. Friction washers 24 are interposed between the heads of each of the swivels 22 and the attachment ears 21a of the deflectors. Suitable handles 21b are attached to the exterior surfaces of deflectors 21 and may be manipulated to angularly adjust the deflectors to a desired position with respect to the air discharge passages 13a the tension of springs 23 frictionally holding the deflectors in desired adjusted positions.

In addition to the efficient heater previously described and the ventilator 11 for effecting the supply of fresh air, our improved heating system includes suitable air discharge means located in the rear portion of the automobile body and preferably comprising a pair of discharge flues formed in the two rear doors respectively of the automobile body. The conventional door structure of most automobiles is especially well adapted for association with our system. By reference to Figs. 1 and 6 it will be seen that we provide a suitable register 25 preferably located in the lower and rearward portion of each of the rear doors R and communicating with the hollow interior of the door. The spaced walls of the door form vertical flues 26 which communicate through air discharge passages 26a with the air outside of the automobile body. Many suitable structures may be utilized for effecting the discharge of air from the upper ends of flues 26 without impairing the external appearance of the automobile doors. One form is illustrated in which the bead or molding 27 at the intermediate portion of the door and at the lower edge of the window is slotted in part and provided with an over-hanging lip 27a concealing the slot.

*Operation*

Immediately after the automobile engine is started, assuming valve 18 to be open, hot exhaust gases are caused to pass through the heating coil 16 which is disposed longitudinally and medially of the heater casing. When fan motor 15 is started a supply of air, a considerable portion of which may be drawn from the fresh air outside of the automobile body, is projected through fan casing 14, laterally through the top wall of the heater casing. This air is immediately impinged against the spiral coils of the heating element 16 and divides, passing longitudinally and outwardly of casing 13 in opposite directions and being further impinged in its longitudinal passage against the tubular heating coil. Hot air is projected rearwardly from the heater casing through the widely spaced discharge passages 13a and the deflection or direction of the discharged and heated air may be adjusted within wide limits by means of the deflector plates or doors 21. It will be noted that the casing 13 is so mounted in the forward part of the car that the discharged passages 13a are disposed at right and left sides of the longitudinal center line of the automobile. The attachment ears 21a of the deflector plates may be provided with slots 21c if desired to permit offset adjustment of the plates relatively to the front wall of the casing and to also permit the plates or doors to be disposed flush against the front walls completely closing the respective discharge passages. It will readily be seen from an inspection of Fig. 2 and as indicated partially by the dotted lines that the combination of the heater casing and doors 21 effect a wide directional adjustment of the warm air discharged from the opposite ends of the heater. This often is desirable for varying the circulation of the air throughout the interior of the body of the automobile in our heating system.

Some amount of air constantly passes through the two oppositely disposed registers 25, assuming the same to be in open position, and this discharge of air is greatly accentuated by the speed and travel of the automobile producing a draft or induced current upwardly through the hollow door structure or flues 26 and out through the air discharge ports 26a. Displacement of air from within the rear portion of the automobile body of course results in a thorough circulation of the air discharged by heater casing 13, preventing the building up of a back pressure or stagnant air space and consequently effecting a thorough and uniform warming of the entire interior of the body if desired. If it is desired to more or less concentrate the circulation of heated air on one or the other sides of the rear seat the ventilator 25 at the opposite side may be closed and the deflectors 21 or at least one thereof may be quickly positioned to more directly distribute the air in the direction of the open ventilator.

It will of course be understood that we do not limit ourselves to the use of hot exhaust gases through coil 16 as a heating medium, hot water or any other hot fluid available being suitable for the purpose, although hot exhaust gases are greatly preferred due to their higher temperatures. The flow of the hot fluid through the coil 16 is greatly facilitated by means of the association of the discharge piece 16b of the coil with the interior of the exhaust discharge 10 of the automobile, the exhaust gas under pressure producing a venturi action or induction upon the tube 16b and throughout the heating coil. With this structure we have found that a relatively small conduit may be satisfactorily utilized for the heating coil, preferably constructed of copper or some other material having a high heat conductivity.

The location of the registers at the bottom portions of the doors which form the air outlet flues cause the heavier or more stagnant air to be drawn from the car thereby materially assisting the proper ventilation of the entire space within the automobile body.

From the foregoing description it will be seen that we have provided a simple, inexpensive and highly efficient automobile heating system adapted to be readily and easily installed in conventional types of automobiles and adapted to thoroughly and substantially uniformly heat and ventilate the interior of the automobile body. The directional supply and circulation of the warm air from the heater may be varied and controlled by the cooperation of the deflector plates 21 and the registers 25 which communicate with the air flues 26 in the door construction.

It will further be seen that a highly efficient and economical automobile heater has been provided adapted to very quickly raise the temperature of cold air to the requisite degree and further adapted to discharge the heated air as desired from two widely spaced points in the unitary heater casing, thus producing a more uniform and better distribution of heat throughout the body of the automobile.

In warm weather with our improved system, valve 18 may be closed and the fan motor 15 operated, the system then functioning efficiently to adequately ventilate and cool the interior of the automobile body.

Attention is also called to the utility and efficiency of our system in cold weather for eliminating the accumulation of frost upon the windshield of the motor vehicle. The circulation of warm air effected by the cooperation of the fan-equipped heater with the air discharge flues effects an adequate movement of the warm air over the windshield for preventing an accumulation of frost.

It will, of course, be understood that various changes may be made in the form, details, proportions and arrangement of the parts without departing from the scope of our invention, which, generally stated, consists in a device capable of carrying out the objects above set forth and in the novel parts and combinations of parts disclosed and defined in the appended claims.

What is claimed is:—

1. In combination with a motor vehicle having an enclosed body, said body being provided with a driver's seat extending transversely across the medial portion thereof, positive air projection means within the forward portion of said body adapted to direct air rearwardly of said body, means for heating the air projected and a pair of upwardly extending flues mounted in the rear portion of said body, said flues having communication with the interior of said body adjacent the floor thereof and having outlets disposed exteriorly of the body and some distance above the floor level, whereby the travelling movement of said motor vehicle will induce a discharge of air from within the body through said flue.

2. In combination with a motor vehicle having an enclosed body provided with the usual front and rear seats, a fan mounted within the forward portion of said body and having means for projecting air rearwardly of said body from two widely spaced points, independently controllable means for heating the air projected and a pair of upwardly extending flues mounted in the rear portion of said body, one disposed at each of the sides of the body, said flues having communication with the interior of said body adjacent the floor thereof and having outlets disposed exteriorly of the body and disposed considerably above the floor level.

3. A ventilating system for an enclosed motor vehicle body having in combination means for projecting air rearwardly from within the front portion of said body and a pair of upwardly extending air discharge flues in the side walls and rear portion of said body, each at one side thereof, said flues having communication with the interior of the body adjacent the floor and at opposite sides of the body and having communication with the outside air at points some distance above the floor level and at opposite sides of the body, whereby the traveling movement of the vehicle will induce a discharge of air from within the body through said flues and assist said air projecting means in effecting ventilation of said body through currents of air moving from the front of the body rearwardly and then diverging towards said discharge flues.

4. A ventilating system for an enclosed automobile body having the usual driver's seat extending transversely across the medial portion thereof, comprising means for projecting air rearwardly from within the front portion of said body and from a level considerably above the floor, a pair of upwardly extending discharge flues formed by the side doors of the body and having air intake passages communicating with the interior of the body at points on the opposite sides and adjacent the floor level, said flues having discharge passages extending through the exterior of the body at points some distance above the floor level, whereby the traveling movement of the vehicle will induce a discharge of air from within the body through said flues.

5. A ventilating system for an enclosed motor vehicle body having in combination means for projecting air rearwardly from within the front portion of said body and a pair of upwardly extending air discharge flues in the side walls and rear portion of said body, each at one side thereof, said flues having communication with the interior of the body adjacent the floor and adjacent the rear on opposite sides of the body and having communication with the outside air at points a substantial distance above the floor level and at opposite sides adjacent the rear of said body, whereby the traveling movement of the vehicle will induce a discharge of air from within said body through said flues, said flues in their induction effect cooperating with said air projecting means to set up a slow passage of air moving rearwardly from the front of said body, then downwardly and divergently to the points of communication of said flues with the interior of said body and also setting up induced currents of air moving downwardly and forwardly from the rear of said body whereby the entire body will be efficiently ventilated.

WILLIAM F. LA MAYEAU.
JOHN W. FARMER.
HARLAN M. SMITH.